United States Patent [19]

Drew, II et al.

[11] Patent Number: 5,578,364
[45] Date of Patent: Nov. 26, 1996

[54] GRAVURE PLATE ASSEMBLY

[75] Inventors: L. Edward Drew, II, Keene; Robert B. Scheuhing, Rindge, both of N.H.

[73] Assignee: Markem Corporation, Keene, N.H.

[21] Appl. No.: 433,068

[22] Filed: May 3, 1995

[51] Int. Cl.$^6$ ........................................ B32B 9/00
[52] U.S. Cl. .................. 428/195; 428/610; 428/615; 428/909; 101/41; 101/163
[58] Field of Search ..................... 428/610, 615, 428/195, 909; 430/269, 271; 101/41, 163

[56]  References Cited

U.S. PATENT DOCUMENTS

| 4,481,282 | 11/1984 | Obata et al. | 430/303 |
| 4,508,032 | 4/1985 | Philipp | 101/163 |
| 4,684,600 | 8/1987 | Worns et al. | 430/271 |
| 5,392,706 | 2/1995 | Drew, II et al. | 101/170 |

FOREIGN PATENT DOCUMENTS

| 0180419A2 | 5/1986 | European Pat. Off. . |
| 0306933A2 | 3/1989 | European Pat. Off. . |

Primary Examiner—Patrick Ryan
Assistant Examiner—Cathy K. Lee
Attorney, Agent, or Firm—Fish & Richardson P.C.

[57] ABSTRACT

A gravure plate assembly having an elastomer pad sandwiched between a more rigid base plate and a less rigid metal top plate bearing an engraving surface.

13 Claims, 7 Drawing Sheets

GRAVURE PLATE ASSEMBLY

BACKGROUND

This invention relates to gravure plate assemblies.

In pad-type gravure printing, an inked engraving is lifted from an engraved gravure plate by a transfer pad and stamped onto an item to receive an image. A typical gravure plate is a thick steel plate with a lapped top surface. Gravure plates have also been constructed by placing a thinner metal or plastic top plate on a base plate so that only the engraved top plate need be discarded following use. The thinner top plates are often coated with a polymer or epoxy layer into which the engraved image can be etched either chemically or with light. It has been proposed to put a hard rubber coating on a metal base plate and mount a plastic top plate on the hard rubber coating.

SUMMARY

In general, in one aspect, the invention features a gravure plate assembly having an elastomer pad sandwiched between a more rigid base plate and a less rigid metal top plate bearing an engraving surface.

Implementations of the invention may include one or more of the following features. The elastomer pad and/or the base plate of the gravure plate assembly may be of uniform composition throughout. The thicknesses of base plate:elastomer pad:top plate may be 10:0.3:0.5. The thickness of the elastomer pad may be between 0.2 and 0.6 mm thick. The thickness of the top plate may be about 0.5 mm. The thickness of the base plate may be at least about 10 mm. The gravure plate assembly may include magnets which hold the top plate to the base plate. It may include vertical pins through the layers of the plate assembly which prevent the layers from moving laterally relative to each other. The top plate may include a polymer layer capable of accepting an engraved image.

In general, in another aspect, the invention features a method of flattening an engraved surface including placing an elastomer pad between a more rigid base plate and a less rigid top plate bearing the engraved surface, and applying a downward force on the top plate such that surface irregularities are compensated for by the elastomer pad.

Advantages of the gravure plate assembly may include one or more of the following. The elastomer pad provides enough flexibility between the top plate and the adaptor plate to correct for imperfections in either plate so that the surface stamped by the transfer pad of the pad printing machine is flat. This permits sharp, clean images to be produced relatively inexpensively. The engraved top plate is inexpensive to produce and use, since it is a relatively thin sheet of metal (e.g., steel), taken from a conventional role of steel sheet. If the top plate includes a polymeric surface layer, the engraving surface of the top plate does not need to be lapped, thus reducing machining costs. Wear on the doctor blade and the top plate are reduced.

The other layers of the assembly (the elastomer pad and adaptor plate) may be reused. Since the elastomer pad provides sufficient tolerance for surface irregularities, the adaptor plate (e.g., aluminum) need only have a ground surface rather than a lapped one, and the underside of the top plate does not need to be ground or lapped.

Other features and advantages will become apparent from the following description and from the claims.

DESCRIPTION

Figure 1A:
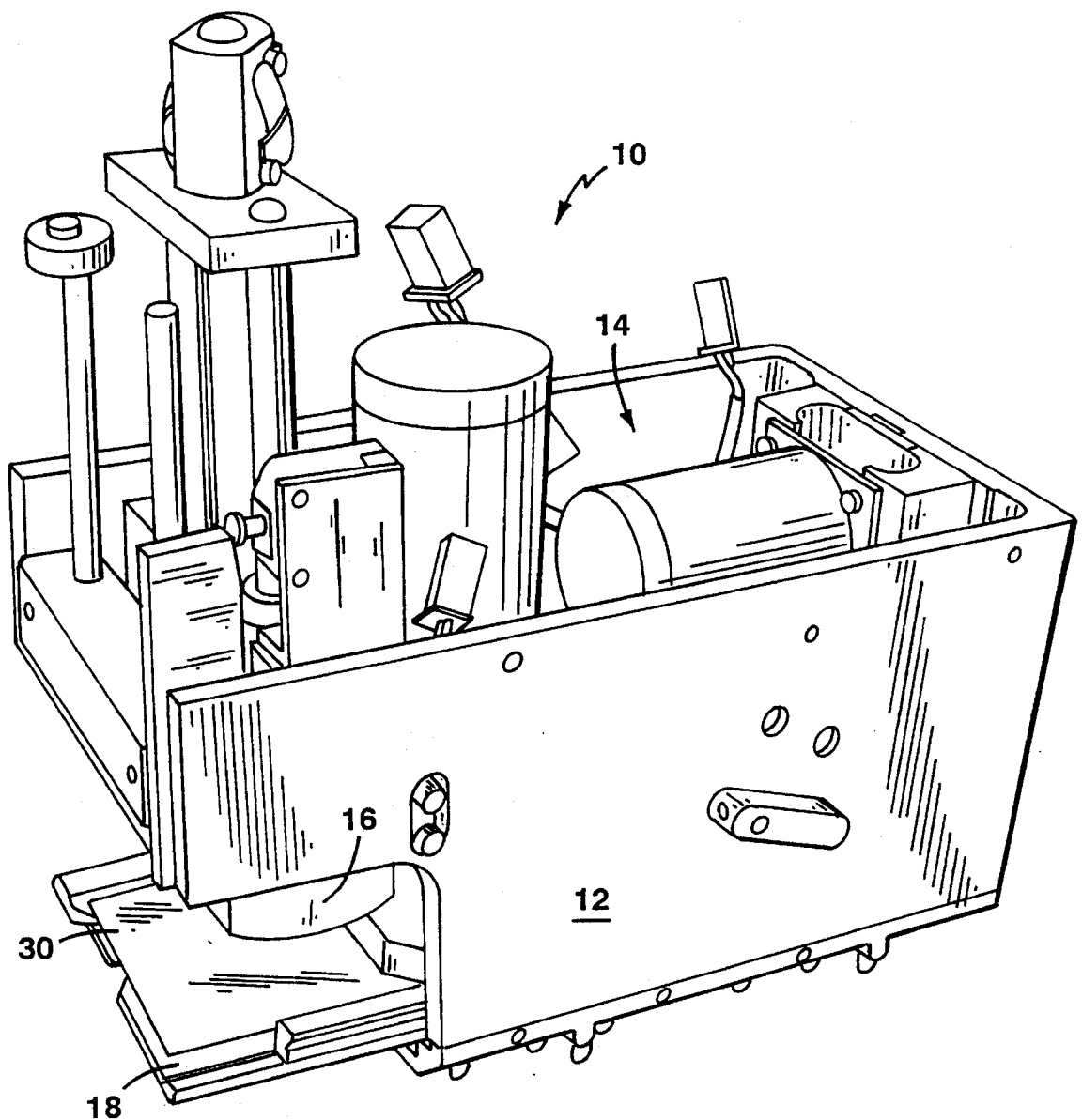
FIGS. 1A and 1B are a perspective view and a side view, respectively, of a pad printing machine.
Figure 1B:
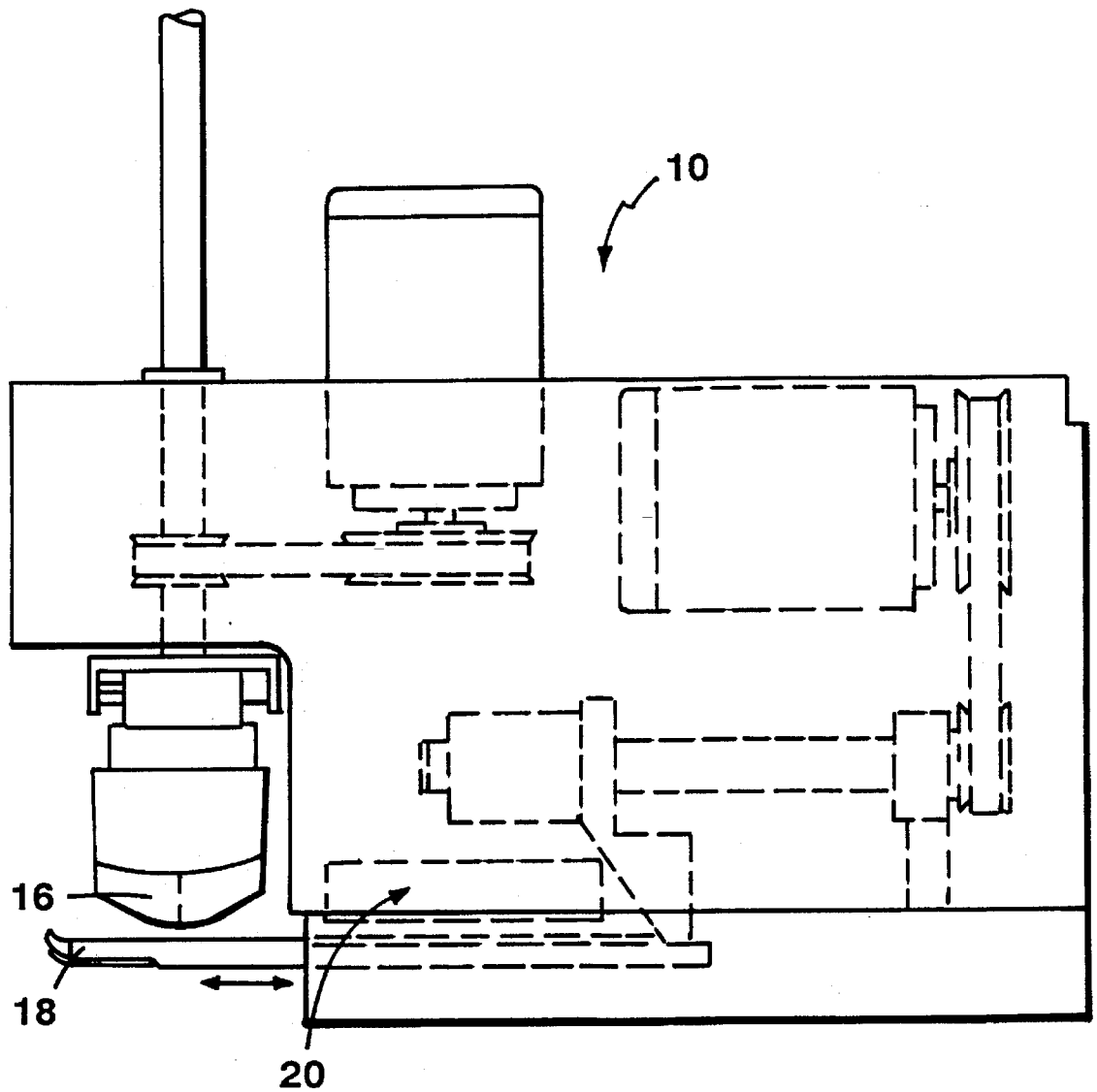

As seen in FIG. 1A, a pad printing machine 10 has a gravure press plate assembly 30 which rides back and forth on a carriage 18 to alternately ink the plate and put it in a position (shown) for receiving a transfer printing pad 16. The carriage is moved by a computer controlled drive system 14 supported on a main frame 12. Inking is done by an inking assembly 20 (FIG. 1B) that includes a removable upside down ink cup. A description of a pad printing machine for use with the gravure press plate assembly is found in U.S. Pat. No. 5,392,706 (incorporated by reference).

Figure 2A:
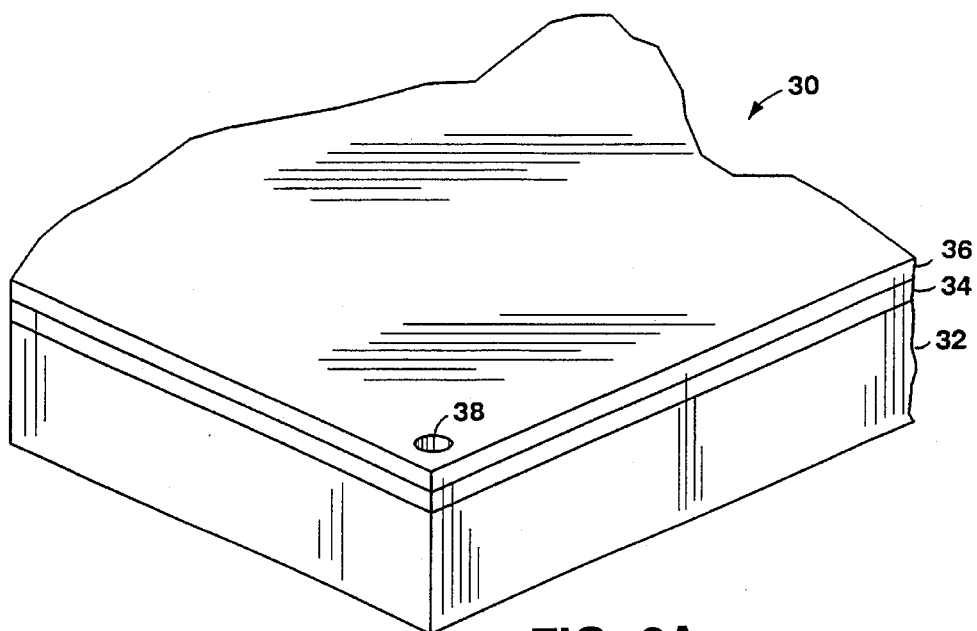
FIGS. 2A and 2B are a perspective view of a fragment of a plate assembly, and a side sectional view of the plate assembly, respectively.

As shown in FIG. 2A, a gravure press plate assembly 30 may have an elastomer pad 34 sandwiched between a top plate 36 (which bears the inked surface) and an adaptor plate 32 forming a base for the assembly. The adapter plate is made of metal (e.g., steel or aluminum), or stone or other suitably rigid material. It can be of any industry standard nominal size or thickness. Preferably, this base plate is 10 mm thick (±0.2 mm), has a uniform composition (solid) throughout, and is ground flat.

Top plate 36 may be a bare metal (e.g., steel) plate or a polymer or epoxy coated metal plate. The coatings can incorporate an engraved image by chemical or photo etching, and may include water or alcohol washout coatings, or epoxy coatings such as Quick-Lase (Markem, Keene, NH). If a coating is present, the top plate does not need to be lapped prior to engraving. Top plate 36 has two holes 38 in opposite corners through which two locator pins 40 may be inserted (FIG. 2B) to prevent lateral motion of the layers relative to each other. One of holes 38 may be slot shaped to increase the tolerance of the plate to variation in the distance between pins 40.

Figure 3:
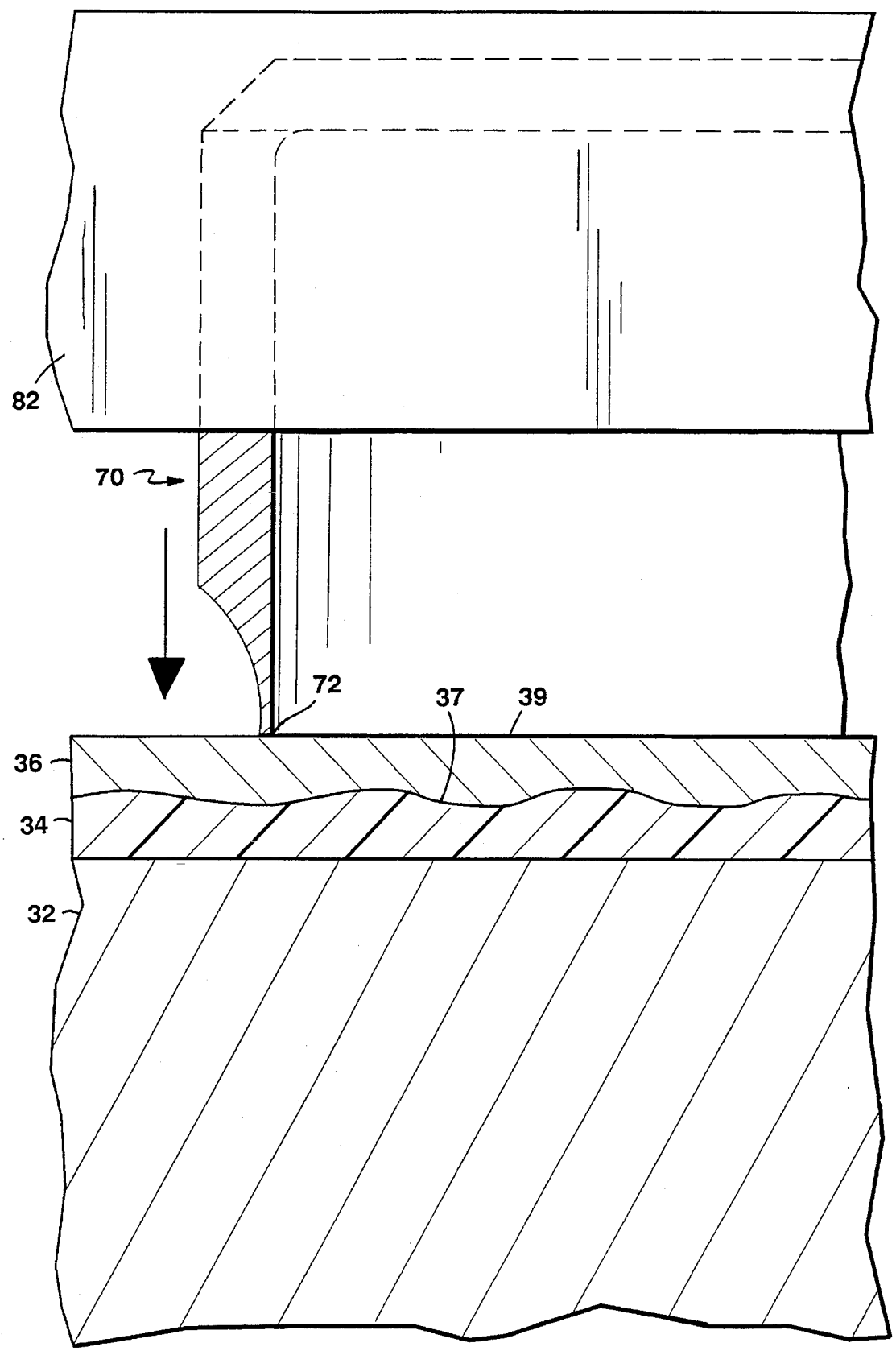
FIG. 3 is a side sectional view of the plate assembly with applied downward pressure.

The elastomer pad 34 keeps the top plate flat during inking and printing even though the top plate is relatively thin and has a bottom surface that is not lapped or ground. For example, the top plate may be wavy, and the elastomer pad allows the top plate to flatten under the downward pressure of the ink cup and doctoring blade. Alternatively, as shown in FIG. 3, the bottom surface 37 of top plate 36 may contain surface irregularities which would deform the top surface 39 when the force of the doctor cup was applied, if the top plate was merely laid directly onto a rigid base plate. Either situation could produce excessive wear on the doctor blade and the plate, and reduce printed image quality. The elastomer pad 34 reduces these effects. With the pad present, the downward force of the ink cup causes the elastomer pad to deform to fill irregularities of bottom surface 37 or flatten waves in top plate 36, leaving top surface 39 flatter. This allows the top plate to be relatively thin (generally about 0.5 mm thick, although any thickness may be used which allows the gravure plate assembly to fit into the pad printing machine) and still achieve quality printing. Because the top plate is the only plate replaced between printing jobs, the costs associated with each job are reduced.

Figure 2B:
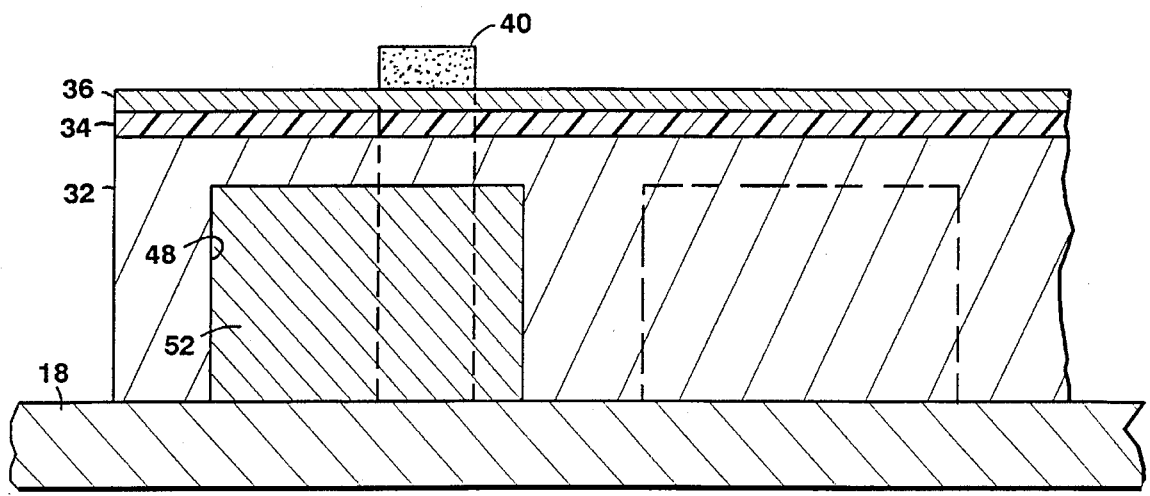
Figure 4A:
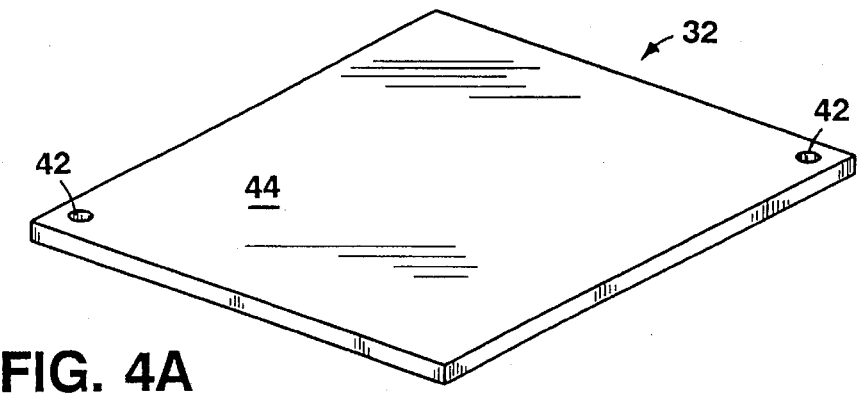
FIGS. 4A and 4B are perspective views top and bottom, of an adaptor plate.
Figure 4B:
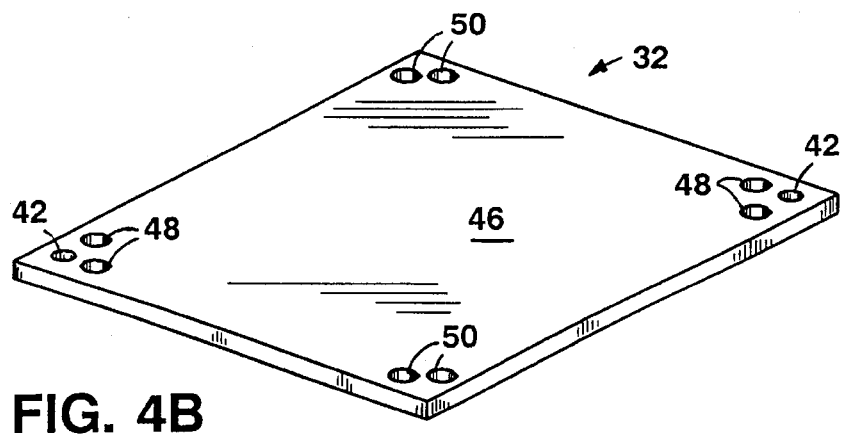

Referring to FIG. 4A, the adapter plate 32 has two holes 42 matching holes 38 in the top plate. Holes 42 extend through opposite corners of the plate, and receive locator pins 40 (FIG. 2B). The bottom surface 46 of the adaptor plate (FIG. 4B) has four pairs of holes 48 and 50, one pair in each corner, which do not completely penetrate the adaptor plate. Disk magnets 52 (FIG. 2B) are inserted into holes 48 and 50 to hold the metal top plate in place against the pad magnetically. Alternatively, the layers of the assembly may be held together with screws, pins having a button head, or adhesive.

Figure 5:
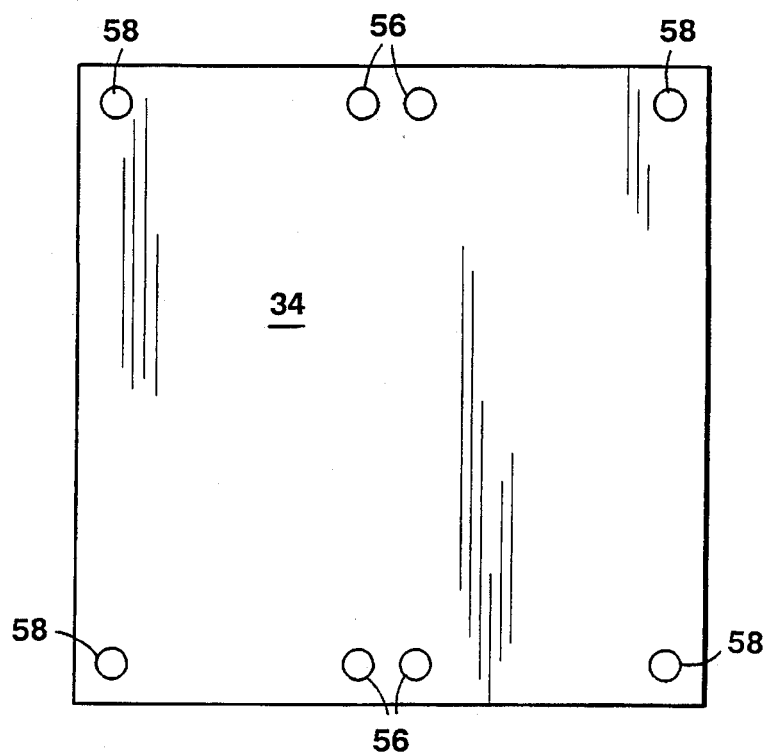
FIG. 5 is a plan view of a pad.

As seen in FIG. 5, elastomer pad 34 has four holes 56 arranged in pairs on opposite edges at the midline, and four holes 58 at the corners. These holes allow the placement of one large top plate 36 or two smaller top plates 36 side by side on the elastomer pad.

The elastomer of the pad is one which is resistant to e.g., swelling or softening caused by inks or solvents, and is of uniform composition throughout. For example, the pad may be a silicon rubber sheet available from many vendors, such as The Rubber Group (Somersworth, N.H.). The preferred range of thicknesses of the pad is 0.2 mm to 0.6 mm. The preferred durometer range is about 30 durometer to 60 durometer. Other materials, thicknesses, or durometers may be used if they do not result in too much deformation of the top plate to permit quality printing and to minimize gouging of the top plate by the doctor edge.

Figure 6:
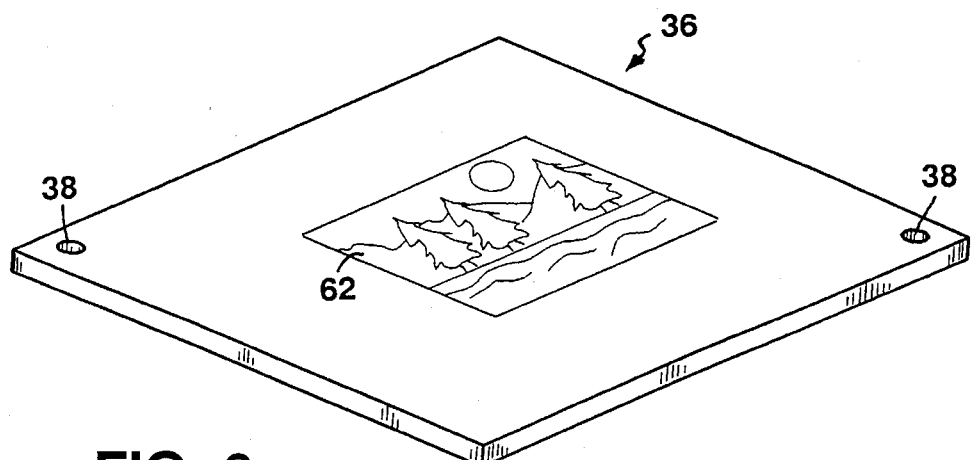
FIG. 6 is a perspective view of a top plate.

The top plate 36 (FIG. 6) covers the adaptor plate and elastomer pad, and can be engraved with an image 62 to be printed. The top plate may be 125 mm to 250 mm long and 250 mm wide, but the dimensions may be changed to adapt to the pad printing machine used. The elastomer pad and adaptor plate could be 250 mm×250 mm, so that two 125 mm×250 mm engraved top plates could be used side by side at the same time. Other combinations of plate sizes can also be used.

Figure 7B:
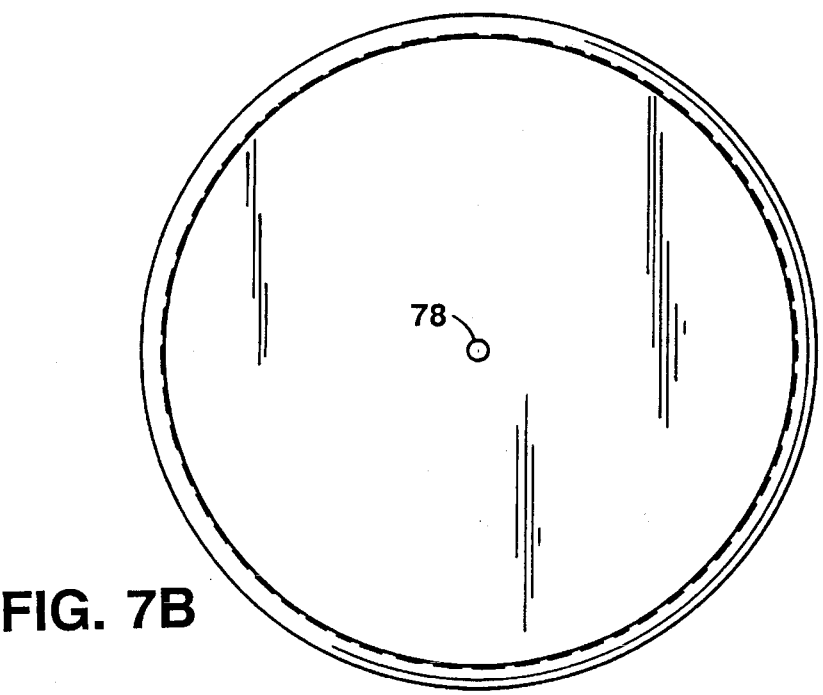
FIGS. 7A and 7B are a side view and a top view, respectively, of an ink cup.
Figure 7A:
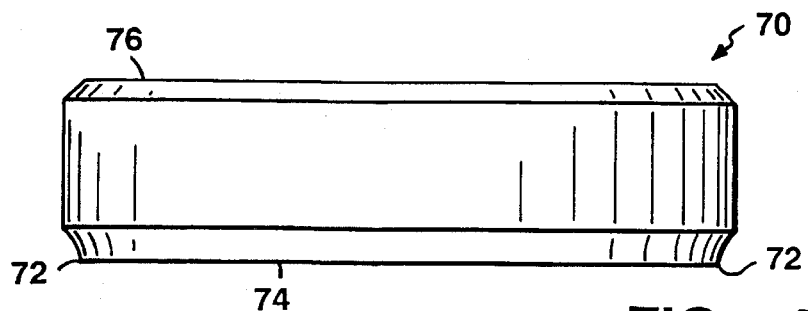
Figure 8:
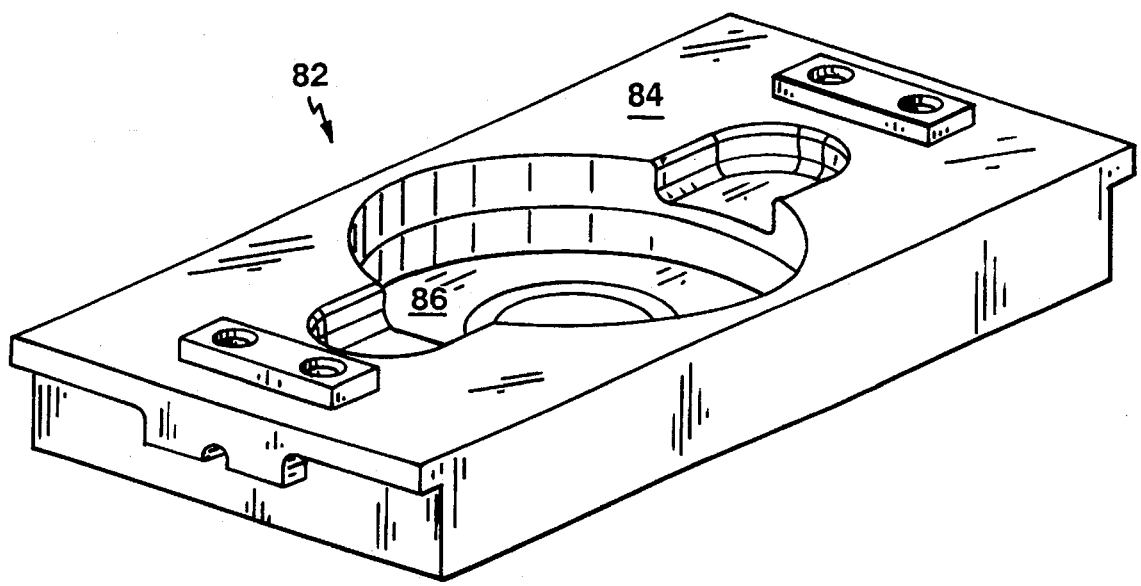
FIG. 8 is a perspective view of an ink cup holder.

Ink is applied and doctored by a shallow cylindrical ink cup 70 (FIGS. 7A and 7B) having a machine finished rim 72 which serves as a doctoring blade. The ink cup is held in an ink cup holder 82 (FIG. 8). Ink cup surface 76 rests on ink cup holder surface 86, and the ink cup assembly is inverted on the gravure plate assembly for use as described in U.S. Pat. No. 5,392,706.

Figure 9:
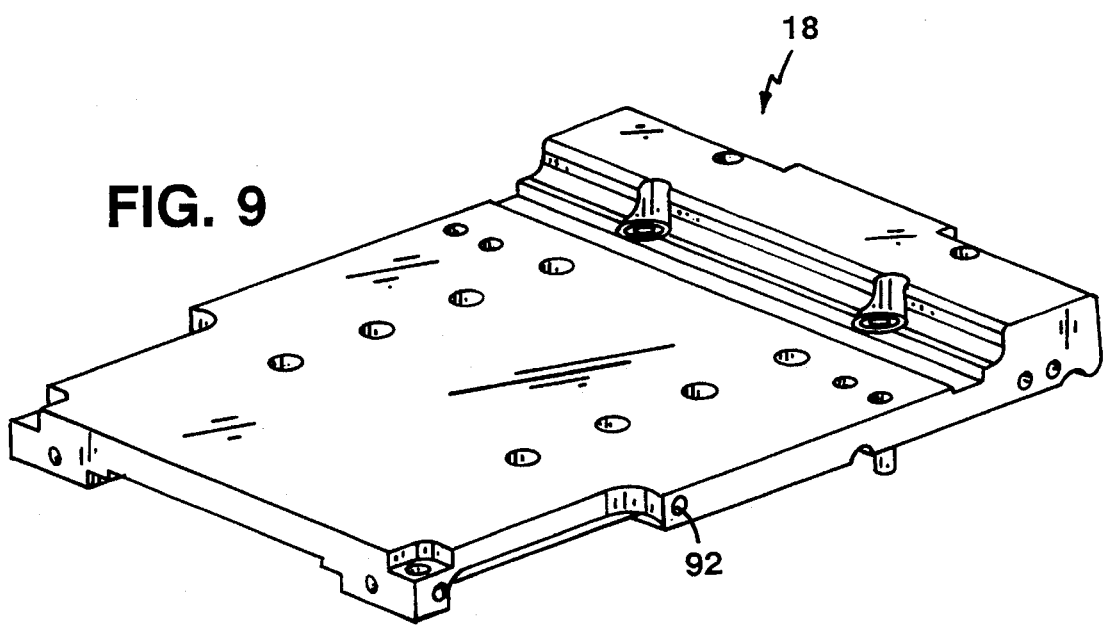
FIG. 9 is a perspective view of a carriage.

The gravure plate assembly 30 is held on carriage 18 (FIG. 9) and is positioned on the carriage by adjustment brackets (not shown) controlled by machine taps 92 on the side of the carriage. The front edge of the carriage 94 provides a lip 96 against which the plate assembly rests. The back edge of the plate assembly is clipped onto the carriage. Slide rails (not shown) are attached to the plate and the carriage assembly is then loaded into the printing machine for use.

Other embodiments are within the scope of the following claims. Any resilient material could be substituted for the elastic pad, including materials that are not supplied in sheet form.

What is claimed is:

1. A gravure plate assembly comprising an elastomer pad sandwiched between a base plate and a metal top plate bearing an engraving surface, wherein said metal top plate is less rigid than said base plate.

2. The gravure plate assembly of claim 1 wherein the elastomer pad is of uniform composition throughout.

3. The gravure plate assembly of claim 1 wherein the base plate is of uniform composition throughout.

4. The gravure plate assembly of claim 1 wherein the proportion of thicknesses of base plate:elastomer pad:top plate is 10:0.3:0.5.

5. The gravure plate assembly of claim 1 wherein the thickness of the elastomer pad is between 0.2 mm and 0.6 mm thick.

6. The gravure plate assembly of claim 1 wherein the thickness of the top plate is about 0.5 mm.

7. The gravure plate assembly of claim 1 wherein the thickness of the base plate is at least about 10 mm.

8. The gravure plate assembly of claim 1 further including magnets which hold the top plate to the base plate.

9. The gravure plate assembly of claim 1 further including vertical pins through the layers of the plate assembly which prevent the layers from moving laterally relative to each other.

10. The gravure plate assembly of claim 1 wherein the top plate further includes a polymer layer capable of accepting an engraved image.

11. A gravure plate assembly comprising a metal base plate having a thickness of at least about 10 mm, an elastomer pad on the base plate, the pad having a uniform thickness in the range of 0.2 to 0.6 mm thick, and a metal top plate having uniform composition and bearing an engraving surface, wherein said metal top plate is less rigid than said base plate.

12. The gravure plate assembly of claim 1, wherein said elastomer pad comprises silicone rubber.

13. The gravure plate assembly of claim 1, wherein said elastomer pad has a hardness that falls within a durometer range of about 30 durometers and about 60 durometers.

\* \* \* \* \*